(12) United States Patent
Samudrala et al.

(10) Patent No.: US 7,324,537 B2
(45) Date of Patent: Jan. 29, 2008

(54) SWITCHING DEVICE WITH ASYMMETRIC PORT SPEEDS

(75) Inventors: Ramaprasad Samudrala, Cupertino, CA (US); Jaisimha Bannur, Sunnyvale, CA (US); Anujan Varma, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 10/622,212

(22) Filed: Jul. 18, 2003

(65) Prior Publication Data

US 2005/0013311 A1      Jan. 20, 2005

(51) Int. Cl.
*H04L 12/28* (2006.01)

(52) U.S. Cl. ...................... 370/412; 370/414
(58) Field of Classification Search ............... 370/412, 370/230.1, 230, 413, 389, 316, 468; 710/29, 710/52
See application file for complete search history.

(56) References Cited

U.S. PATENT DOCUMENTS

| | | | | |
|---|---|---|---|---|
| 4,092,732 A | 5/1978 | Ouchi | .............. | 714/5 |
| 4,331,956 A | 5/1982 | Anderson | .............. | 340/226 |
| 4,335,458 A | 6/1982 | Krol | .............. | 714/263 |
| 4,695,999 A | 9/1987 | Lebizay | .............. | 370/217 |
| 5,127,000 A | 6/1992 | Henrion | .............. | 370/394 |
| 5,130,982 A * | 7/1992 | Ash et al. | .............. | 370/352 |
| 5,191,578 A | 3/1993 | Lee | .............. | 370/418 |
| 5,260,935 A | 11/1993 | Turner | .............. | 370/394 |
| 5,274,785 A | 12/1993 | Kuddes | .............. | 710/111 |
| 5,442,752 A | 8/1995 | Styczinski | .............. | 711/4 |
| 5,483,523 A | 1/1996 | Nederlof | | |
| 5,517,495 A * | 5/1996 | Lund et al. | .............. | 370/399 |
| 5,590,123 A * | 12/1996 | Lyles et al. | .............. | 370/397 |
| 5,631,908 A * | 5/1997 | Saxe | .............. | 370/235 |
| 5,649,157 A | 7/1997 | Williams | .............. | 711/151 |
| 5,682,493 A | 10/1997 | Yung | .............. | 712/217 |
| 5,751,710 A * | 5/1998 | Crowther et al. | .............. | 370/423 |
| 5,832,278 A | 11/1998 | Pham | .............. | 710/243 |
| 5,848,434 A | 12/1998 | Young | .............. | 711/144 |
| 5,859,835 A | 1/1999 | Varma | .............. | 370/229 |
| 5,860,097 A | 1/1999 | Johnson | .............. | 711/128 |
| 5,978,951 A | 11/1999 | Lawler | .............. | 714/758 |
| 6,055,625 A | 4/2000 | Nakada | .............. | 712/216 |
| 6,061,345 A | 5/2000 | Hahn | .............. | 370/351 |
| 6,167,508 A | 12/2000 | Farrell | .............. | 712/217 |
| 6,170,032 B1 | 1/2001 | Izzard | .............. | 710/244 |
| 6,185,222 B1 * | 2/2001 | Hughes | .............. | 370/414 |
| 6,188,698 B1 | 2/2001 | Galand | .............. | 370/412 |
| 6,282,686 B1 | 8/2001 | Cypher | .............. | 714/758 |
| 6,321,306 B1 | 11/2001 | Arimilli | .............. | 711/145 |
| 6,359,891 B1 | 3/2002 | Bergantino | .............. | 370/398 |
| 6,408,378 B1 | 6/2002 | O'Connor | .............. | 712/217 |
| 6,487,171 B1 * | 11/2002 | Honig et al. | .............. | 370/235 |
| 6,810,038 B1 * | 10/2004 | Isoyama et al. | .............. | 370/395.42 |

(Continued)

*Primary Examiner*—Edan Orgad
*Assistant Examiner*—Lawrence J Burrowes
(74) *Attorney, Agent, or Firm*—Douglas J. Ryder; Ryder IP Law, PC

(57) ABSTRACT

In general, in one aspect, the disclosure describes a switching device that includes a plurality of ports. The ports operate at asymmetric speeds. The apparatus also includes a switching matrix to provide selective connectivity between the ports. The apparatus further includes a plurality of channels to connect the ports to the switching matrix. The number of channels associated with each port is determined by speed of the port.

26 Claims, 11 Drawing Sheets

U.S. PATENT DOCUMENTS 6,826,160 B1 * 11/2004 Wang et al. ................ 370/329
7,072,350 B2 * 7/2006 Dooley et al. .............. 370/416
7,170,854 B1 * 1/2007 Orrell et al. ................ 370/228
2002/0110086 A1 * 8/2002 Reches ....................... 370/235
2004/0085979 A1 * 5/2004 Lee et al. ................... 370/412

* cited by examiner

| 920 SOURCE ADDRESS MEMORY | |
|---|---|
| 0 | |
| 1 | 6 |
| 2 | |
| 3 | 7 |
| 4 | 3 |
| 5 | 0 |
| 6 | 4 |
| 7 | 2 |

| 910 VALID DESTINATION MEMORY | |
|---|---|
| 0 | 0 |
| 1 | 1 |
| 2 | 0 |
| 3 | 1 |
| 4 | 1 |
| 5 | 1 |
| 6 | 1 |
| 7 | 1 |

| 900 SOURCE PORT | DESTINATION PORT |
|---|---|
| 0 | 5 |
| 1 | |
| 2 | 7 |
| 3 | 4 |
| 4 | 3 |
| 5 | |
| 6 | 1 |
| 7 | 3 |

SWITCHING DEVICE WITH ASYMMETRIC PORT SPEEDS

BACKGROUND

Store-and-forward devices, such as switches and routers, are used in packet networks, such as the Internet, for directing traffic at interconnection points. The store-and-forward devices include a plurality of line cards for receiving and transmitting data from/to external sources. The line cards are connected to one another via a backplane and a switching fabric. The backplane provides data paths between each line card and the switching fabric and the switching fabric provides configurable data paths between line cards. The backplane consists of a plurality of links (channels). Each channel is capable of transmitting data at a certain speed. If the line cards are transmitting data at speeds faster than the capabilities of the channels, the line cards can break the data up into sections and transmit the sections in parallel over several channels (strip the data). The number of channels required to support the line cards is based on the speed of the line cards and the capacity of the channels.

When a store-and-forward device has line cards operating at different speeds, the number of channels associated with each line card is based on the number of channels required for the line card operating at the highest speed. Accordingly, there will be channels associated with lower-speed line cards that are not used. Additionally, the switching fabric will have ports that are not used. This is an inefficient use of resources. The inefficiency grows as the difference in speed between line cards grows. As the capacity of switches and routers increases, the need for supporting ports with different speeds is becoming more common. Users need to be able to plug in legacy line cards into new systems, while populating a few slots with new line cards supporting ports with higher data rates. For example, an Internet router may have line cards with OC-48 and OC-192 ports today, and may need to support line cards with OC-768 ports in the future. In addition, higher-density line cards where the traffic from many external ports is aggregated into a single fabric port may require higher data-rate fabric ports.

BRIEF DESCRIPTION OF THE DRAWINGS

The features and advantages of the various embodiments will become apparent from the following detailed description in which:

FIG. 9 illustrates exemplary valid destination memory and source address memory contents, according to one embodiment;

FIG. 10 illustrates exemplary contents of various crossbar configuration block memories, according to one embodiment.

DETAILED DESCRIPTION

A store-and-forward device, such as a packet switch or router includes a plurality of interface modules, a switch fabric for selectively connecting different interface modules, and a backplane for connecting the interface modules and the switching fabric. The interface modules can receive data from (receivers or ingress ports) and transmit data to (transmitters or egress ports) multiple sources (e.g., computers, other store and forward devices) over multiple communication links (e.g., twisted wire pair, fiber optic, wireless). Each of the sources may be capable of transmitting/receiving data at different speeds, different quality of service, etc. over the different communication links. The interface modules can transmit/receive data using any number of protocols including Asynchronous Transfer Mode (ATM), Internet Protocol (IP), and (Time Division Multiplexing) TDM. The data may be variable length or fixed length blocks, such as cells, packets or frames. The data received from external sources is stored in a plurality of queues. The queues may be stored in any type of storage device and preferably are a hardware storage device such as semiconductor memory, on-chip memory, off-chip memory, field-programmable gate arrays (FPGAs), random access memory (RAM), or a set of registers. The interface modules may be line cards or chips contained on line cards. The interface modules may be Ethernet (e.g., Gigabit, 10 Base T), ATM, Fibre channel, Synchronous Optical Network (SONET), Synchronous Digital Hierarchy (SDH) or various other types. A single line card may include a single interface module (receiver or transmitter) or multiple interface modules (receivers, transmitters, or a combination). A line card having multiple interface modules may have all the same type of interface modules (e.g., ATM) or may contain some combination of different interface module types. The backplane may be electrical or optical.

Figure 1:
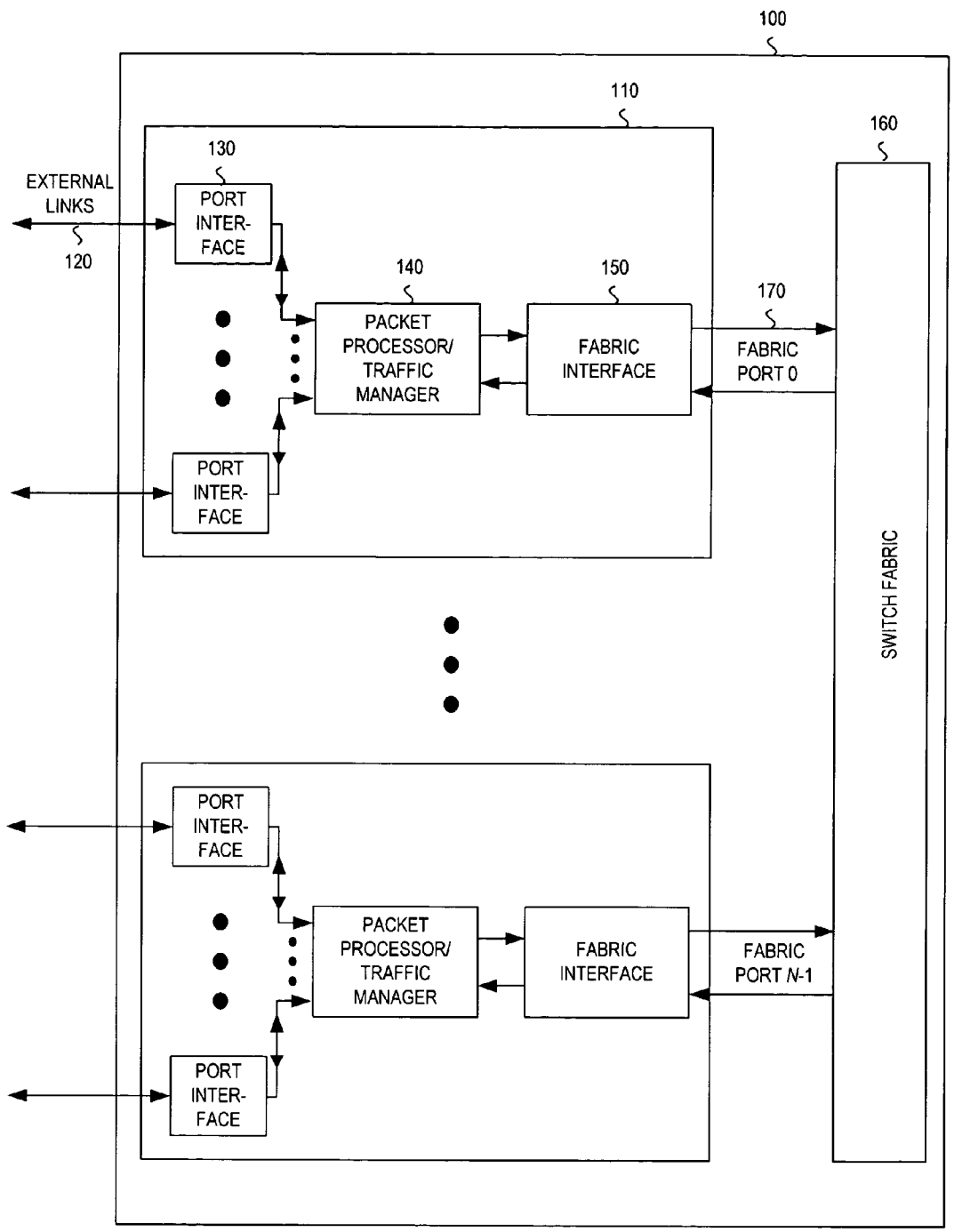
FIG. 1 illustrates an exemplary block diagram of a store-and-forward device, according to one embodiment.

FIG. 1 illustrates an exemplary block diagram of a store-and-forward device 100. The device 100 includes a plurality of line cards 110 that connect to, and receive data from, external links 120 via port interfaces 130 (a framer, a Medium Access Control device, etc.). A packet processor and traffic manager device 140 receives data from the port interface 130 and provides forwarding, classification, and queuing based on flow (e.g., class of service) associated with the data. A fabric interface 150 connects the line cards 110 to a switch fabric 160 that provides re-configurable data paths between the line cards 110. Each line card 110 is connected to the switch fabric via associated fabric ports 170 (from/to the switch fabric 160). The switch fabric 160 can range from a simple bus-based fabric to a fabric based on crossbar (or crosspoint) switching devices. The choice of fabric depends on the design parameters and requirements of the store-and-forward device (e.g., port rate, maximum number of ports, performance requirements, reliability/ availability requirements, packaging constraints). Crossbar-based fabrics are the preferred choice for high-performance routers and switches because of their ability to provide high switching throughputs.

Figure 2:
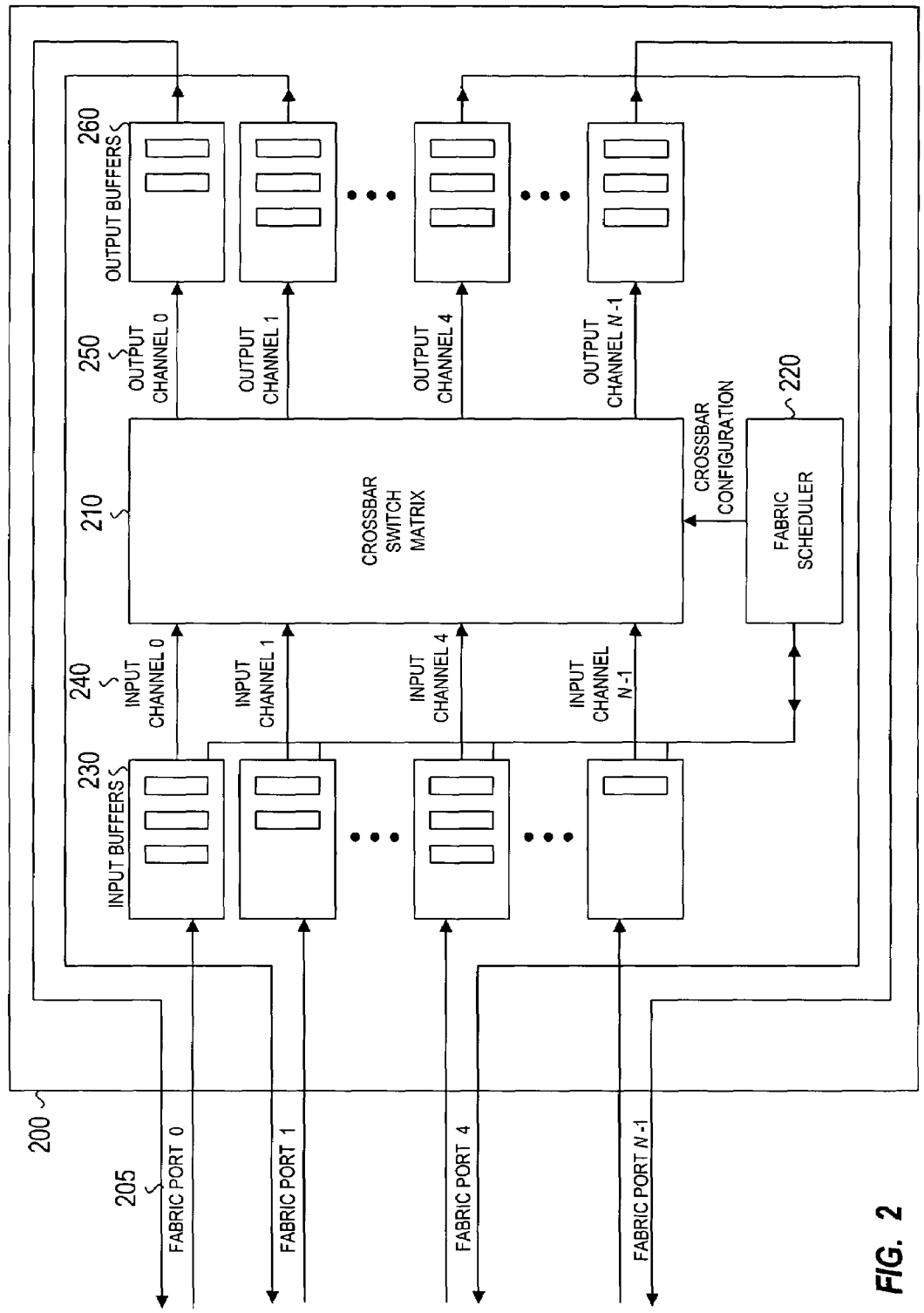
FIG. 2 illustrates an exemplary block diagram of a crossbar-based packet switching fabric, according to one embodiment.

FIG. 2 illustrates an exemplary block diagram of a crossbar-based packet switch fabric 200. The fabric 200 connects to each line card via associated fabric ports 205 (e.g., to and from port for each line card). The fabric 200 includes a crossbar switching matrix 210, a fabric scheduler 220, input buffers 230 to hold arriving packets from the fabric ports 205, input channels 240 to transmit data from the input buffers 230 to the crossbar matrix 210 (e.g., associated ports) output buffers 250 to hold packets prior to departing from the fabric ports 205, and output channels 260 to transmit data from the crossbar matrix 210 (e.g., associated ports) to the output buffers 250.

A backplane (not illustrated) consists of a plurality of channels (input 240 and output 260) that provide connectivity between the fabric ports 205 and the crossbar matrix 210 so as to provide switching connectivity between line cards. With advances in serial communication technologies, the channels (input 240 and output 260) are preferably high-speed serial links. High-speed serial data can be carried over either electrical backplanes or optical backplanes. If an optical backplane is used, the transmitting line card must convert electrical signals to optical signals and send the optical signals over fiber, and the destination line card must receive the optical signals from the fiber and reconvert them to electrical signals.

The crossbar matrix 210 is logically organized as an array of N×N switching points, thus enabling any of the packets arriving at any of N input ports to be switched to any of N output ports, where N represents the number of channels. These switching points are configured by the fabric scheduler 220 at packet boundaries. Typically, the packets are switched through the crossbar switching matrix 210 in batches, where a batch consists of at most one packet selected from each input port, in such a way that no more than one of the packets is destined for each out port.

Each of the packets, arriving at one of the input buffers 230, has a header containing the destination port number where it needs to be switched. The fabric scheduler 220 periodically reads the destination port information from the headers of the packets stored in the input buffers 230 and schedules a new batch of packets to be transferred through the crossbar switching matrix 210. All the packets in a batch (a maximum of N packets) are transferred in parallel across the crossbar switching matrix 210. While the packets from a scheduled batch are being transferred through the crossbar 210, the scheduler 220 can select the packets to form the next batch, so that the transmission of the new batch of packets can start as soon as transmission of the current batch ends. At the end of each batch of packets, the fabric scheduler 220 re-configures the crossbar switching matrix 210 so as to connect each input port to the output port where its next packet is destined to.

When the data rate for an individual fabric port is greater that the data rates supported by the data channels connecting the fabric port to the crossbar switching matrix 210, the data from each fabric port is striped over multiple crossbar data channels. In such a system, each stripe from the fabric ports is switched through a separate crossbar plane.

Figure 3:
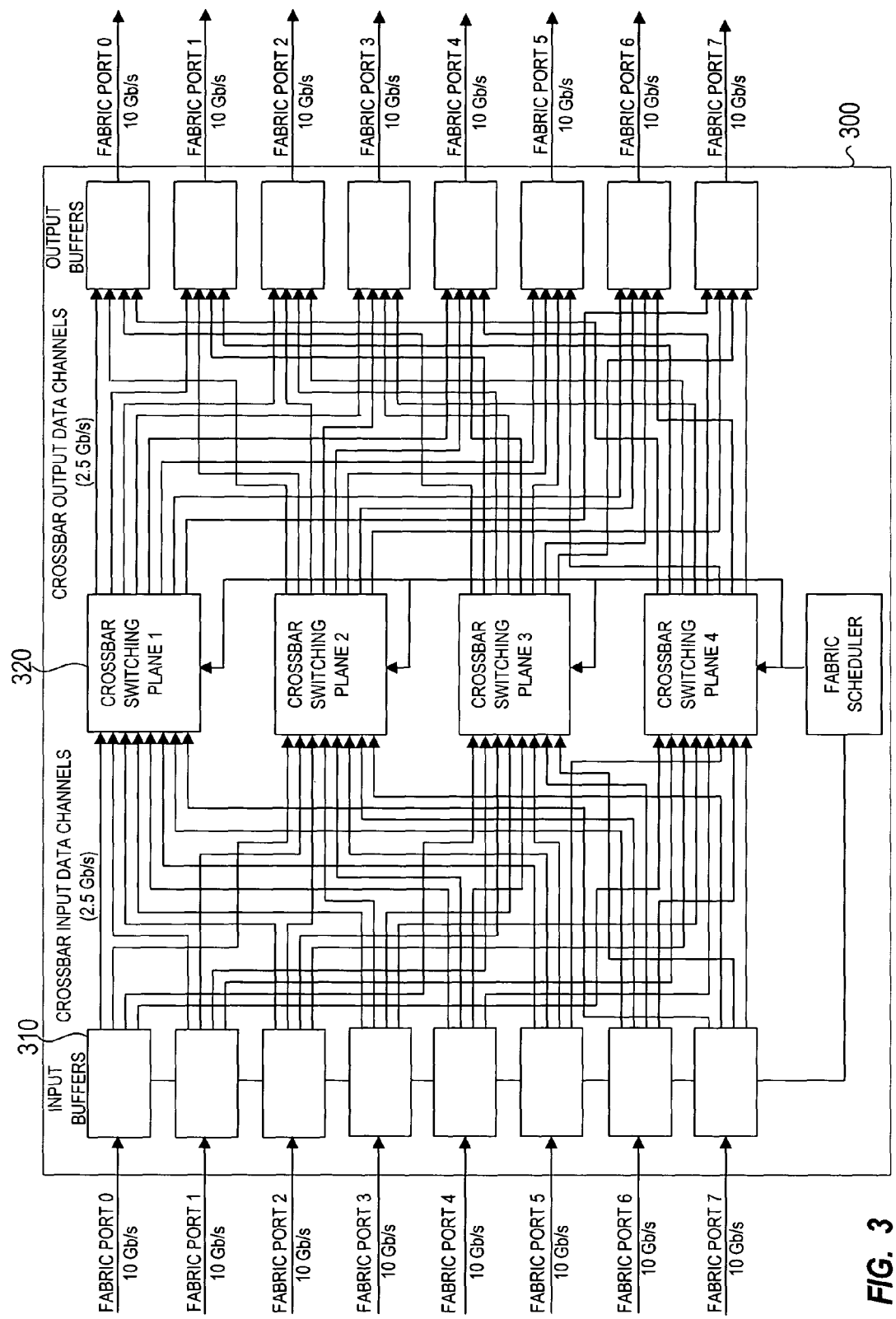
FIG. 3 illustrates an exemplary block diagram of a crossbar-based switching fabric having multiple switch planes, according to one embodiment.

FIG. 3 illustrates an exemplary crossbar switching fabric 300 having eight fabric ports 310, each port operating at a data rate of 10 Gigabits/second (Gb/s), and four 8×8 crossbar planes 320, having a maximum data rate of 2.5 Gb/s per channel. The data from each fabric port 310 is striped across the four crossbar switching planes 320 (e.g., Stripe 1 from each of the eight fabric ports 310 is switched through crossbar plane 1, Stripe 2 through crossbar plane 2, and so on). Such striping of the data can be performed at different granularities (e.g., bit, byte, word). The switching planes 320 may be separate crossbar devices, or may be configured within a larger crossbar device. That is, the 4 crossbar planes 320 may be constructed with (1) four 8×8 data channel physical crossbar devices (as illustrated in FIG. 3), (2) two 16×16 physical crossbar devices, with each physical crossbar devices serving two switching planes, or (3) a single 32×32 crossbar device serving all four switching planes.

Figure 4:
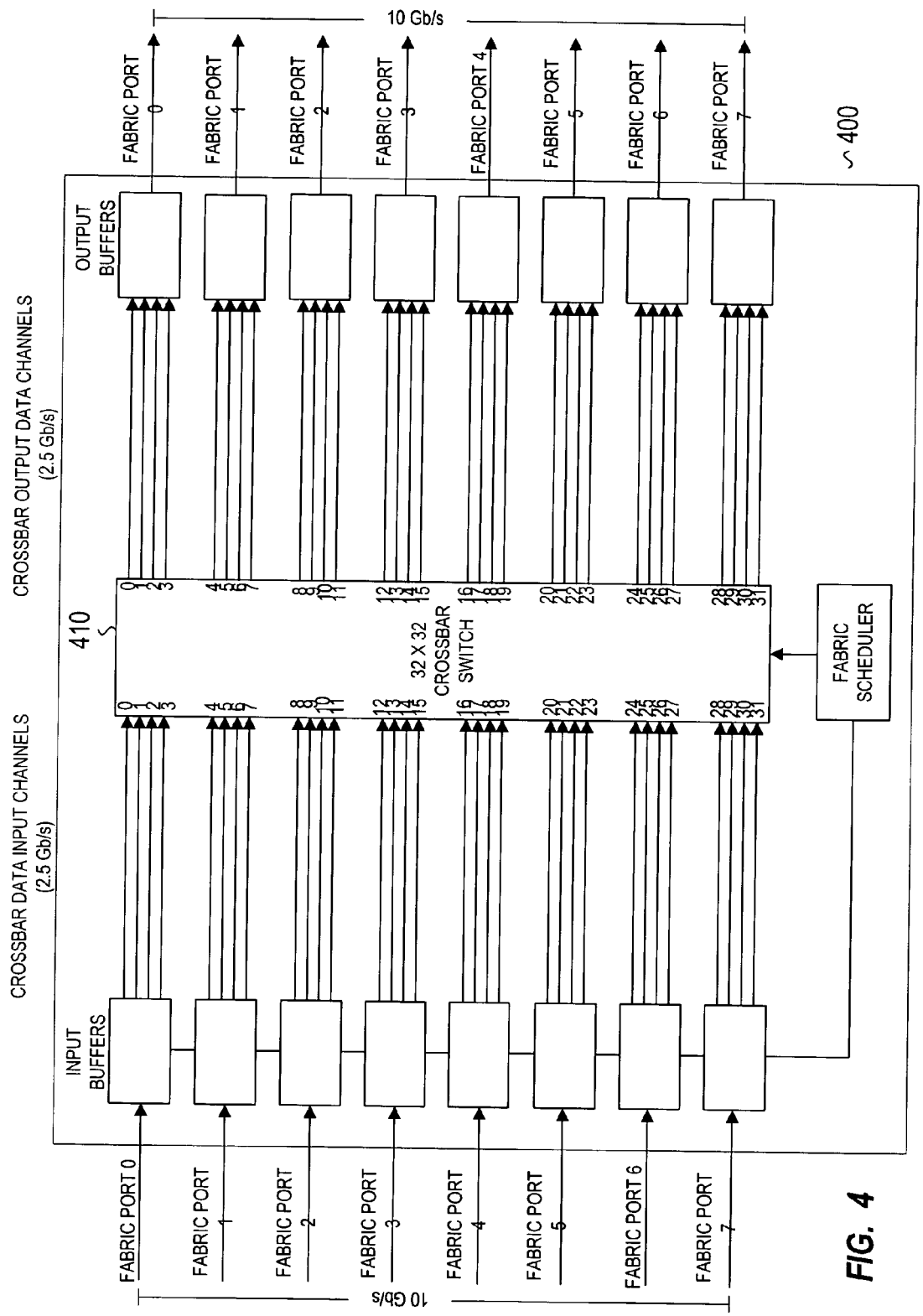
FIG. 4 illustrates exemplary block diagram of a single crossbar-based switching fabric supporting multiple switch planes, according to one embodiment.

FIG. 4 illustrates an exemplary crossbar switching fabric 400 including a 32×32 crossbar switching device 410. Each fabric port connects to four ports on the crossbar switching matrix 410. A first logical 8×8 switching plane would include the crossbar data input/output channels 0, 4, 8, 12, 16, 20, 24, 28. Likewise, a second logical 8×8 switching would include the crossbar data input/output channels 1, 5, 9, 13, 17, 21, 25, 29; and so on.

Figure 5:
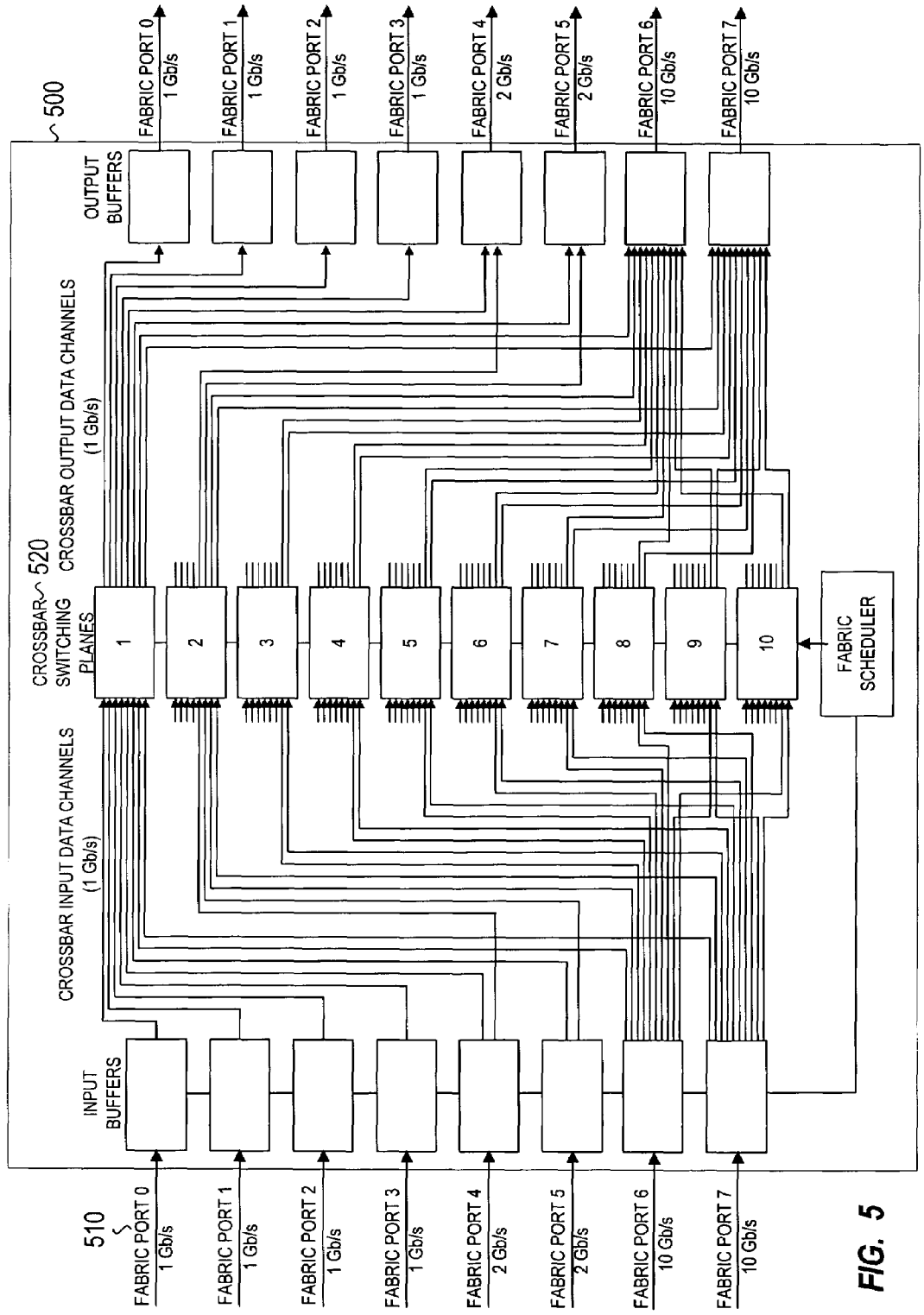
FIG. 5 illustrates an exemplary block diagram of a crossbar-based switching fabric operating at different speeds, according to one embodiment.

When all of the fabric ports in the system do not operate at the same speed, the crossbar switching planes in the fabric is designed to accommodate the transfer rate from the highest-speed port. FIG. 5 illustrates an exemplary switch fabric 500 having eight fabric ports 510 where the first four ports (Ports 0 through 3) operate at a speed of 1 Gb/s each, the next two (Ports 4 and 5) operate at a speed of 2 Gb/s each, the last two ports (Ports 6 and 7) operate at 10 Gb/s each, and the maximum data rate of a crossbar data channel is 1 Gb/s. The crossbar switch fabric 500 includes ten 8×8 crossbar switching planes 520 to account for the fact that 10 crossbar channels are required to transmit the 10 Gb/s of fabric ports 6 and 7. Ports 0-3 use only a first switching plane (only require a single channel and thus single switching plane), ports 4-5 use only the first and a second switching plane (only require two channels), and ports 6-7 use all ten switching planes. The striping is such that the number of crossbar planes used when sending data from a fabric port A to a fabric port B is based on the minimum of the data rates of the two ports. For example, transferring data between (a) port 0 (1 Gb/s) and port 5 (2 Gb/s) utilizes only a single (first) plane, (b) Port 4 (2 Gb/s) and Port 6 (10 Gb/s) utilizes only the first and second planes, and (c) port 6 (10 Gb/s) and port 7 (10 Gb/s) utilizes all ten planes.

The switch fabric 500 has a total of 80 data channels available and only 28, 4×1 (ports 0-3)+2×2 (ports 4-5)+2×10 (ports 6-7), are used in the system to connect to the fabric ports 510. The remaining 52 (65%) are unused. This inefficiency can become even more severe with an increase in the number of ports and an increase in the difference between their data rates. For example, in a system with 128 ports (126 1 Gb/s ports and two 10 Gb/s ports) having a crossbar data channel rate of 1 Gb/s, a total of ten 128×128 crossbar switching planes are needed to construct the crossbar matrix. Only 146 (126×1+2×10) of the 1280 (or 11.4%) of the crossbar data channels will be used, and 88.6% of the channels are wasted.

Figure 6:
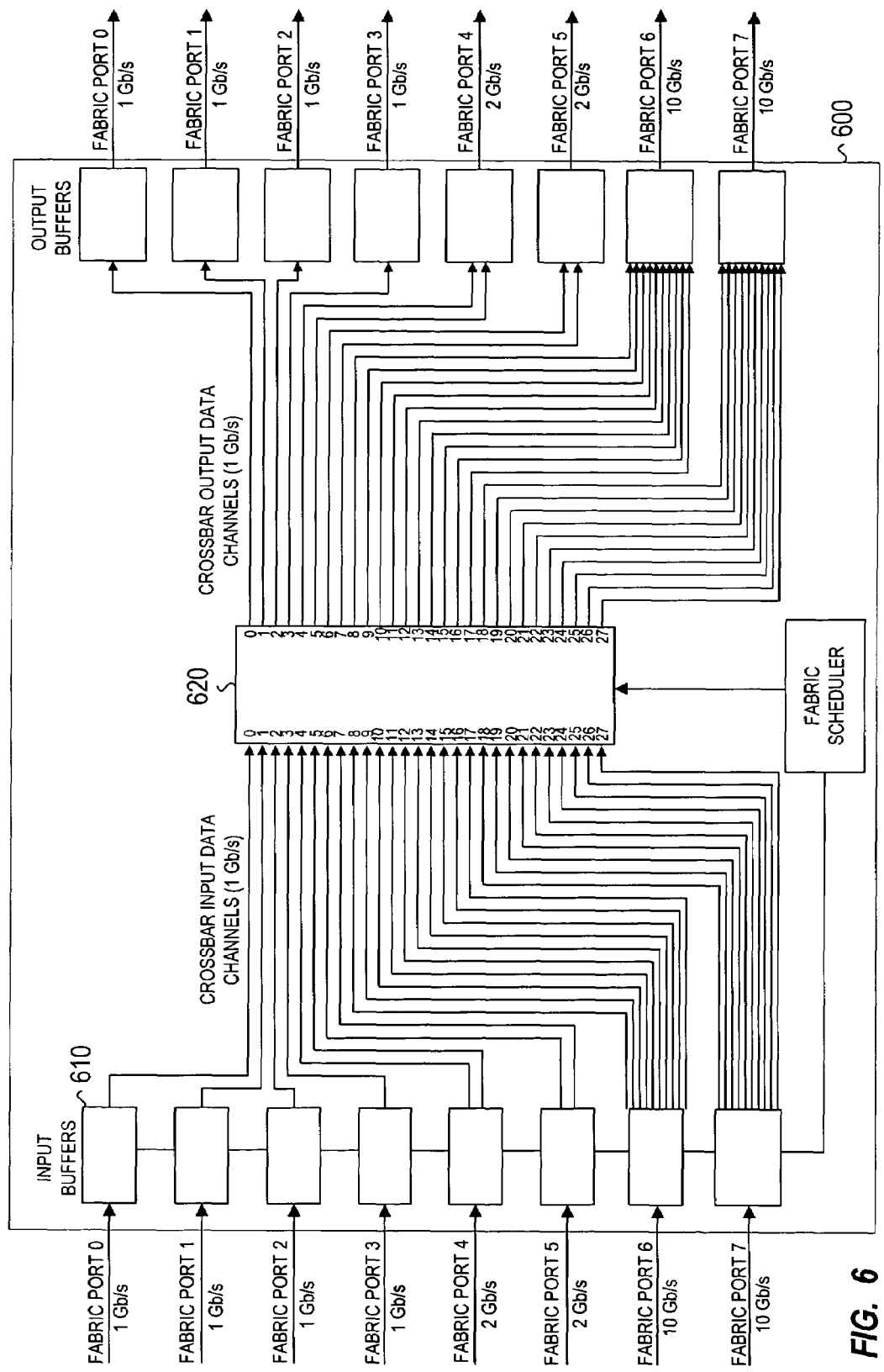
FIG. 6 illustrates an exemplary block diagram of a crossbar-based switching fabric with channels assigned by speed, according to one embodiment.

FIG. 6 illustrates an exemplary switch fabric 600, where each fabric port is assigned channels based on the speed of the fabric port instead of each fabric port being assigned the same number of channels. The switch fabric 600 has the same fabric layout as the switch fabric 500. That is, the switch fabric 600 includes 8 fabric ports 610, with first four ports (ports 0 through 3) operating at a speed of 1 Gb/s each, the next two (ports 4 and 5) operating at a speed of 2 Gb/s each, the last two ports (ports 6 and 7) operating at 10 Gb/s each, and the maximum data rate of a crossbar data channel being 1 Gb/s. A single 28×28 crossbar device 620, with 28 data input channels and 28 data output channels, is used to provide switching between the fabric ports 610. Each of the first four fabric ports (0-3) uses only one data channel (1 Gb/s fabric utilizes single 1 Gb/s channel) and thus one port of the crossbar (ports 0-3), each of the next two ports (ports 4-5) uses two channels (2 Gb/s fabric utilizes two 1 Gb/s channels) and thus two ports each of the crossbar (ports 4-5 and 6-7 respectively), and the last two ports (ports 6-7) each use ten channels (10 Gb/s fabric utilizes ten 1 Gb/s channels) and thus ten ports each of the crossbar (ports 8-17 and 18-27 respectively).

During each scheduling cycle, the fabric scheduler configures the crossbar device such that the data input channels are connected to the appropriate data output channels. The data is transferred at the slower of the fabric port data rates. Thus, the number of channels used for each transfer is based on the minimum of the data rates of the two fabric ports that are connected. For example, if data is transferred from (a) input fabric port 0 (1 Gb/s) to output fabric port 5 (2 Gb/s), the input channel numbered 0 will be connected to the output channel numbered 6 (first channel associated with output fabric port 5), resulting in a transfer rate of 1 Gb/s, (b) input fabric port 4 (2 Gb/s) to output fabric port 6 (10 Gb/s), input channels 4 and 5 will be connected to output channels 8 and 9 respectively (first 2 channels associated with output fabric port 6), resulting in a transfer rate of 2 Gb/s, or (c) input fabric port 6 (10 Gb/s) to output fabric port 7 (10 Gb/s), the ten crossbar input channels numbered 8 through 17 will be connected to the ten output channels 18 through 27 pairwise, resulting in a transfer rate of 10 Gb/s.

Figure 7:
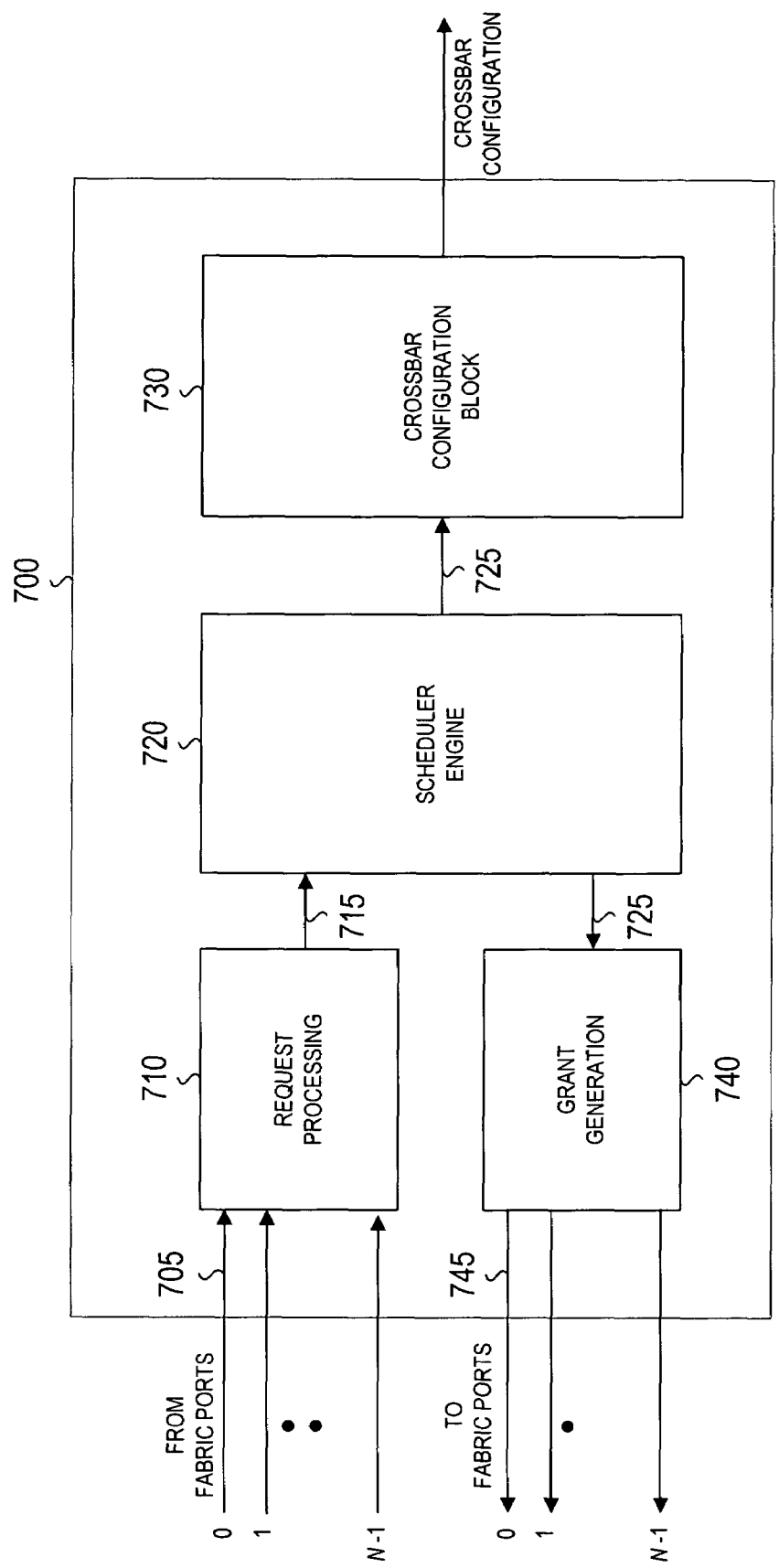
FIG. 7 illustrates an exemplary block diagram of the fabric scheduler, according to one embodiment.

FIG. 7 illustrates an exemplary block diagram of a fabric scheduler 700. The fabric scheduler 700 includes a request processing block 710, a scheduler engine 720, a crossbar configuration block 730, and a grant generation block 740. The request processing block 710 receives from the fabric ports a status of their buffers 705 and generates requests 715 for the scheduler engine 720. The scheduler engine 720 receives the requests 715 for the fabric ports and performs arbitration among them to arrive at a pairwise matching of fabric ports for transmitting data. The scheduler engine 720 provides the pairwise matches 725 to the grant generation block 740. The grant generation block 740 generates grants 745 and communicates the grants 745 to the fabric ports, instructing them to send data to the egress port that was assigned by the scheduler engine 720. The scheduler engine 720 also provides the pairwise matches 725 to the crossbar configuration block 730. The crossbar configuration block 730 is responsible for configuring the crossbar devices according to the matching 725 computed by the scheduler engine 720, so that the data arriving from an ingress fabric port on a crossbar input channel (or set of input channels) is directed to the output channel (or set of output channels) connected to the egress port.

Figure 8:
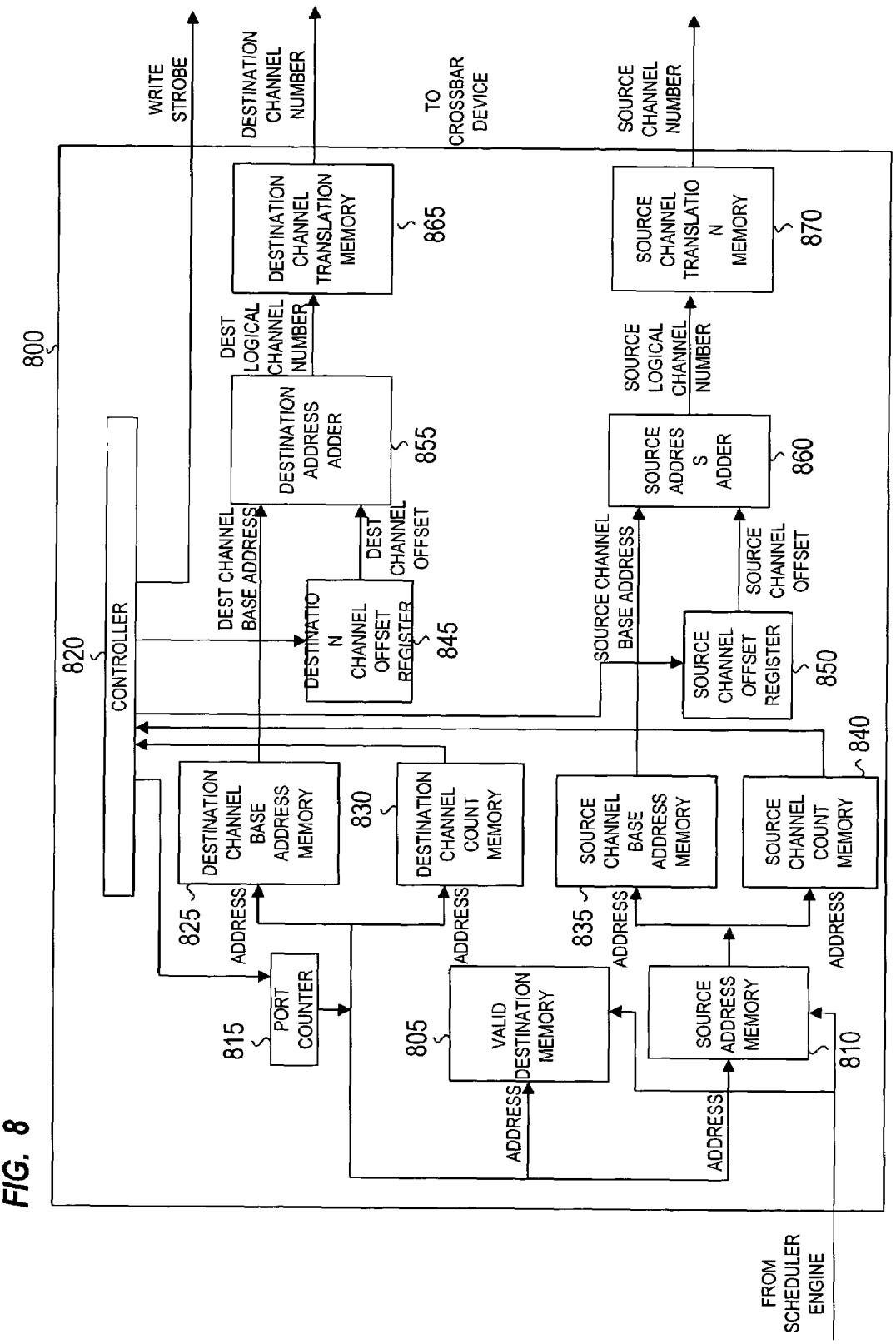
FIG. 8 illustrates an exemplary block diagram showing elements of the crossbar configuration block in a fabric scheduler, according to one embodiment.

FIG. 8 illustrates an exemplary detailed block diagram of a crossbar configuration block 800. The cross bar configuration block 800 includes a valid destination memory 805, a source address memory 810, a port counter 815, a controller 820, a destination channel base address memory 825, a destination channel count memory 830, a source channel base address memory 835, a source channel count memory 840, a destination channel offset register 845, a source channel offset register 850, a destination address adder 855, a source address adder 860, a destination channel translation memory 865, and a source channel translation memory 870. The controller 820 controls the operation of the crossbar configuration block 800.

The valid destination memory 805 is an array containing one bit for each output fabric port (destination port). The source address memory 810 is a one-dimensional array of input fabric port (source port) numbers associated with each destination port number. At the end of each scheduling period, the crossbar configuration block 800 receives from the scheduler engine the pairwise matching (results) of fabric ports based on the requests received from the ports during the current scheduling period. The results are stored in the valid destination memory 805 and the source address memory 810. Bits in the valid destination memory 805 are active (set to '1') if the scheduler engine has selected the corresponding destination port to receive data during the current scheduling cycle and is inactive (set to '0') if the corresponding destination port has not been selected to receive data in the current cycle. The value stored for each active destination port in the source address memory 810 is the address of the source port that has been selected to send data (to that destination port) during the current scheduling cycle. FIG. 9 illustrates an exemplary pairwise matching result 900 for an eight fabric port switch, and the corresponding information stored in the valid destination memory 910 and the source address memory 920. The results 900 show that there are six source to destination matches. The results 900 are mapped into the memories 910, 920. Each of the entries in the valid destination memory 910 is active (set to '1') except ports 0 and 2 as the results 900 indicate that no data is scheduled to be transferred to those destination ports this scheduling cycle. In the source address memory 920, the source port associated with the active destination ports is captured.

Referring back to FIG. 8, the destination channel base address memory 825 is an array containing one value per destination port. The value stored is the address of the first output channel of the crossbar device connected to (associated with) the associated destination port. The destination channel count memory 830 is an array containing one value per destination port. The value stored is the number of output channels of the crossbar device connected to the associated destination port. The source channel base address memory 835 is an array containing one value (first input channel of the crossbar device connected to the source associated source port) for each source port. The source channel count memory 840 is an array containing one value (number of input channels of the crossbar device connected to the associated source port) per source port.

Figure 10:
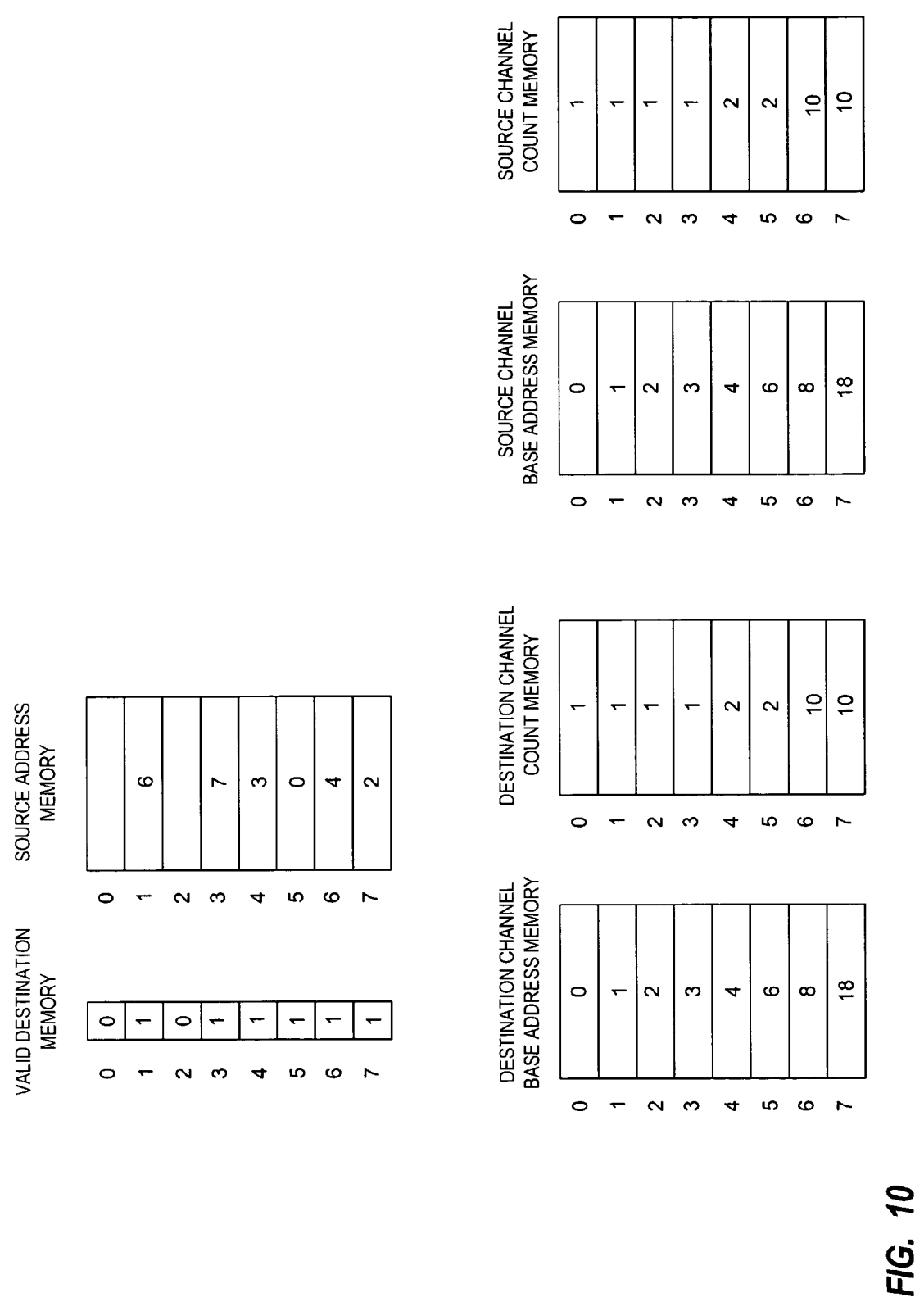

FIG. 10 illustrates contents in each of the valid destination memory 805, the source address memory 810, the destination channel base address memory 825, the destination channel count memory 830, the source channel base address memory 835, and the source channel count memory 840 for the exemplary fabric switch 600 of FIG. 6. The base address and count memories for both the source and destination ports contain the same information, because the number of input channels connected to a fabric port is the same as the number of output channels connected to it.

The port counter 815 is controlled by the controller 820 and steps through each destination fabric port and configures the crossbar channel or set of crossbar channels associated with each valid destination fabric port. For each port, the valid destination memory 805 indicates if the fabric port is to be connected as a destination (is valid) and the source address memory 810 provides the address of the source port to be connected to it (if applicable). If the ports are to be connected, then the first crossbar output channel to connect them is given by the value stored at location in the destination channel base address memory 825 associated with the current destination port. The first crossbar input channel is given by the value stored at the location in the source channel base address memory 835 associated with the current source port (source port to be connected to current destination port as identified by output from source address memory 810). The number of crossbar output channels associated with the destination port is obtained from the count value stored in the destination channel count memory 830 for the current destination port. Likewise, the number of crossbar input channels associated with the source port is obtained from the count value stored in the source channel count memory 840 for the current source port.

The destination channel base address and the source channel base address are passed through the destination address adder 855 and the source address adder 860, respectively. The other input to the destination address adder 855 is the destination channel offset from the destination channel offset register 845. The destination channel offset register 845 is a register containing the offset value of the current crossbar output channel being configured. The other input to the source address adder 860 is the source channel offset from the source channel offset register 850. The source channel offset register 850 is a register containing the offset value of the current crossbar input channel being configured. These channel offset registers 845, 850 allow cycling through the crossbar channels that need to be connected for the pair of fabric ports (destination and source). These registers 845, 850 are initially cleared to zero, and incremented in each programming cycle until the necessary number of channels for connecting the source and destination ports have been configured. The necessary number of channels is the minimum of the counts contained in the destination channel count memory 830 and the source channel count memory 840 for the respective destination and source ports.

The output of the destination address adder 855 and the source address adder 860 can be considered logical channel numbers. Accordingly, a destination channel translation memory 865 and a source channel translation memory 870 are provided. These two memories enable the re-mapping of a crossbar logical data channel to a different data channel (physical channel). The translation memories 865, 870 map the logical channel numbers into physical channel numbers. When the re-mapping capability from logical channel numbers to physical channel numbers is not needed, the translation memories are programmed so that the logical channel maps to the physical channel with the same number. However, the re-mapping capability is useful in a number of ways. For example, when the crossbar devices are assembled on a printed circuit board, it provides flexibility for the routing of signal traces on the board, leading to a simpler board layout. Another application of the translation memories is in dealing with crossbar channel failures. By providing a set of redundant crossbar channels, a failed channel can be remapped to one of the redundant channels using the translation memories.

The destination channel translation memory 865 outputs a destination channel number and the source channel translation memory 870 outputs a source channel number. The source channel number indicates the input data channel number of the crossbar device and the destination channel number indicates the output data channel number of the crossbar device that are to be connected. The controller 820 generates a write strobe signal that indicates when the source and destination channel numbers are valid. The write strobe signal is used to program the information into the crossbar devices. The destination channel number, the source channel number and the write strobe signal from the controller 820 constitute the configuration signals for the crossbar device.

It should be noted that the format of the crossbar configuration block and the interface signals shown in FIG. 8 are for illustration only. There are many ways of designing this configuration interface that would not depart from the current scope. For example, more than one pair of channels may be connected together with a single activation of the write strobe signal.

Figure 11:
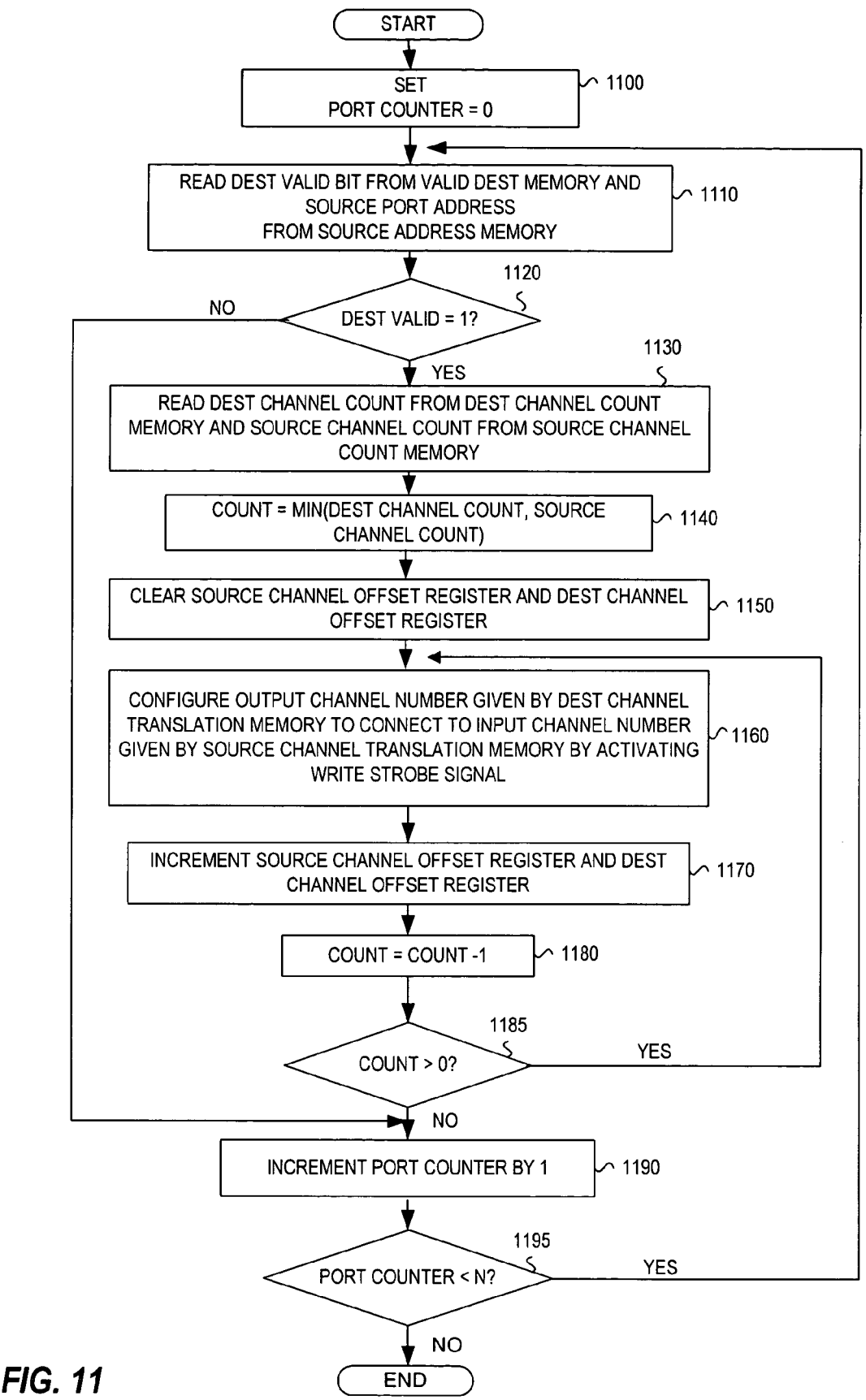
FIG. 11 illustrates an exemplary flowchart of operations of a crossbar configuration block, according to one embodiment.

FIG. 11 illustrates an exemplary flowchart of the sequence of operations performed by the crossbar configuration block, according to one embodiment. For ease of understanding the flowchart will be discussed in relation to the crossbar configuration device 800 disclosed with respect to FIG. 8. The operations in FIG. 11 are performed under the control of the controller 820. The controller 820 could be implemented in various forms, including but not limited to, a state machine, software, and firmware.

The configuration sequence starts with initializing the port counter 815 to zero (1100). The port counter 815 contains the current destination fabric port number being processed. This value is used as the index to the valid destination memory 805, the source address memory 810, the destination channel base address memory 825 and the destination channel count memory 830. A destination valid bit for the current destination port is read from the valid destination memory 805 and the corresponding source port address is read from the source address memory 810 (1110). A determination is then made as to whether the destination port is receiving data (is valid) as indicated by the destination valid bit (1120). If the bit is not active, set to '0', (1120 No), the current destination port is not receiving data during the current scheduling cycle and the port counter 815 is incremented by 1 (1190).

If the destination port is valid (1120 Yes), the destination channel count associated with the current destination port is read from the destination channel count memory 830 and the source channel count associated with the source port to be connected (source port address associated with destination port address in the source address memory 810) is read from the source channel count memory 840 (1130). The destination and source channel count values provide the number of crossbar channels connected to the destination and source fabric ports respectively. The minimum of the source and destination channel counts is calculated and stored in a variable count (1140). This value represents the number of distinct crossbar channel pairs that need to be configured to connect the current pair of destination and source ports.

The destination channel offset register 845 and the source channel offset register 850 are cleared, set to zero (1150). The destination channel base address provided from the destination channel base address memory 825 and the output (destination channel offset) of the destination channel offset register 845 are sent to the destination address adder 855. The destination address adder 855 uses the destination channel offset as an offset to compute the destination channel number by adding it to the destination channel base address. Similarly, the source channel base address is provided from the source channel base address memory 835 and the source channel offset of the source channel offset register 850 are sent to the source address adder 860. The source address adder 860 uses the source channel offset as an offset to compute the source channel number by adding it to the source channel base address. The output of the destination address adder 855 provides the current channel number for the crossbar output channel to be configured, and the output of the source address adder 860 provides the current channel number for the crossbar input channel to be configured. These channel numbers pass through the respective translation memories 865, 870 and appear as output signals of the crossbar configuration block 800. When the values of the output and input channel numbers appear at the respective outputs, the values are loaded into the crossbar device by activating the write strobe signal (1160).

After the current pair of channels have been configured, both the destination channel offset register 845 and the source channel offset register 850 are incremented by one to point to the next output channel and input channel, respectively (1170). The count variable is then decremented by 1, (1180), and a determination is made as to whether the count is greater than 0 (1185). If the count is greater than 0 (1185 Yes), more channels remain to be configured for the current pair of fabric ports, and the process returns to 1160 where the next pair of channels for the current pair of fabric ports is configured.

If the count is found to be 0 (1185 No), all channel pairs of the current port pair have already been configured. The port counter 815 is incremented by 1 to point to the next destination fabric port (1190). A determination is then performed to determine if all the ports have been processed. In order to determine if the last port has been processed a determination is made as to whether the port counter is less than N, the total number of ports (1195). If the value of the port counter 815 is less than N (1195 Yes), more fabric ports remain to be configured and the operations returns to 1110. If the value of the port counter 815 is not less than N (1195 No) the process ends. If the last port (N-1) was processed and then incremented by 1 in 1190, the 1190 determination will be No and the process will end.

The process defined above with respect to FIG. 11 is in no way limited thereto. Rather, the process could be modified in numerous ways (e.g., order, arrangement) without departing from the scope.

It should be noted that the process defined in FIG. 11 only connects the fabric ports that are transmitting data and does not connect the fabric ports that are not transmitting data. Moreover, if two fabric ports of different speeds are connected there will be channels associated with the higher speed fabric port that are not connected. However, in some fabric systems, it is necessary to connect all the data output channels of the crossbar devices to data sources even when the channel does not take part in a data transfer during the current period. This may be necessary to preserve synchronization on the receive side of the fabric ports, or because of electrical considerations. This requirement can be satisfied by connecting all the crossbar output channels that do not participate in a data transfer in the current cycle to one of the input channels that does not participate in the data transfers.

The connection of unused (idle) output channels to unused (idle) input channels can be completed at the end of the process defined in FIG. 11. Alternately, this feature can also be integrated into the operations of the process of FIG. 11 by connecting any unused output channels to any unused input channel as each destination port is processed.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. A switching device comprising:
    a plurality of ports to transmit data to and receive data from external sources, wherein the ports operate at asymmetric speeds;
    a switching matrix to provide selective connectivity between the ports;
    a plurality of channels to connect the ports to the switching matrix, wherein number of channels associated with each port is determined by speed of the port; and
    a scheduler to select connectivity between the ports and to configure the switching matrix accordingly, wherein said scheduler connects all the channels associated with a first port to a subset of the channels associated with a second port, if the first port is operating at a lower speed than the second port.

2. The device of claim 1, wherein said scheduler configures said switching matrix to connect the channels associated with an incoming port to the channels associate with a corresponding outgoing port.

3. The device of claim 1, wherein data is transferred between an incoming port and a corresponding outgoing port at speed of the slower of the incoming port and the corresponding outgoing port.

4. The device of claim 3, wherein number of channels connected together to transfer data between the incoming port and the corresponding outgoing port is number of channels associated with the slower of the incoming port and the corresponding outgoing port.

5. The device of claim 1, wherein at least some subset of the plurality of ports send requests to said scheduler; and said scheduler performs arbitration of the requests to select connectivity.

6. The device of claim 1, wherein said scheduler configures said switching matrix to connect inactive incoming ports to inactive outgoing ports.

7. The device of claim 1, wherein said scheduler configures said switching matrix to connect inactive incoming channels to inactive outgoing channels.

8. The device of claim 1, wherein said scheduler determines logical port connections and translates them to physical port locations.

9. The device of claim 1, wherein said scheduler includes
    a request processor to process requests for permission to transmit data received from at least some subset of the sources;
    a schedule engine to determine requests to be accepted;
    a grant generator to generate grants for the sources that had requests accepted; and
    a configurator to instruct switching matrix to connect channels associated with a source to channels associated with a destination based on the grants.

10. A method comprising:
    selecting connection paths between a plurality of ports, wherein the ports are capable of operating at different speeds from one another, wherein the ports are connected to a switching matrix via a plurality of channels, and wherein number of channels associated with a port is determined by speed of the port; and configuring the switch matrix, in response to said selecting, to connect the channels associated with an incoming port to the channels associate with a corresponding outgoing port, wherein said configuring includes connecting all the channels associated with a first port to a subset of the channels associated with a second port, if the first port is operating at a lower speed than the second port.

11. The method of claim 10, further comprising receiving a plurality of requests for permission to transmit data from an incoming port to an outgoing port, wherein said selecting is based at least in part on the plurality of requests received.

12. The method of claim 11, further comprising performing arbitration of the requests.

13. The method of claim 12, further comprising granting permission to transmit data from incoming ports to corresponding outgoing ports.

14. The method of claim 10, further comprising transmitting data from incoming ports to corresponding outgoing ports via the switch matrix.

15. The method of claim 14, wherein said transmitting includes transmitting the data from an incoming port to a corresponding outgoing port at speed of the slower of the incoming port and the corresponding outgoing port.

16. The method of claim 10, wherein said configuring includes connecting inactive incoming ports to inactive outgoing ports.

17. The method of claim 10, wherein said configuring includes connecting inactive incoming channels to inactive outgoing channels.

18. The method of claim 10, wherein said selecting includes selecting logical input port to output port connections and translating the logical ports to physical ports.

19. A store and forward device comprising:
a plurality of Ethernet cards to receive data from and transmit data to external sources, wherein a first one of the plurality of Ethernet cards is capable of operating at a first speed and a second one of the plurality of Ethernet cards is capable of operating at a second speed that is different than the first speed;
a switching matrix to provide selective connectivity between the Ethernet cards;
a backplane consisting of a plurality of channels to connect the plurality of Ethernet cards to the switching matrix, wherein number of channels associated with an Ethernet card is based on speed of the Ethernet card; and
a scheduler to select connectivity between Ethernet cards and to configure the switching matrix accordingly, wherein said scheduler connects all the channels associated with a first Ethernet card to a subset of the channels associated with a second Ethernet card, if the first Ethernet card is operating at a lower speed than the second Ethernet card.

20. The device of claim 19, wherein said scheduler configures said switching matrix to connect the channels associated with an incoming Ethernet card to the channels associate with a corresponding outgoing Ethernet card.

21. The device of claim 19, wherein at least some subset of the plurality of Ethernet card send requests to said scheduler; and
said scheduler performs arbitration of the requests to select connectivity.

22. The device of claim 19, wherein said scheduler configures said switching matrix to connect inactive incoming Ethernet card to inactive outgoing Ethernet card.

23. The device of claim 19, wherein said scheduler configures said switching matrix to connect inactive incoming channels to inactive outgoing channels.

24. The device of claim 19, wherein said scheduler determines logical Ethernet card connections and translates them to physical Ethernet card connections.

25. The device of claim 19, wherein said scheduler includes
a request processor to process requests for permission to transmit data received from at least some subset of the interface modules;
a schedule engine to determine requests to be accepted;
a grant generator to generate grants for the interface modules that had requests accepted; and
a configurator to instruct switching matrix to connect channels associated with an ingress interface module to channels associated with an egress interface module based on the grants.

26. The device of claim 19, wherein the backplane is electrical.

* * * * *